United States Patent
Robinson et al.

(10) Patent No.: US 11,681,683 B2
(45) Date of Patent: *Jun. 20, 2023

(54) TRANSACTION COMPENSATION FOR SINGLE PHASE RESOURCES

(71) Applicant: Red Hat, Inc., Raleigh, NC (US)

(72) Inventors: Paul Fletcher Robinson, Whitley Bay (GB); Thomas John Jenkinson, Leeds (GB)

(73) Assignee: Red Hat, Inc., Raleigh, NC (US)

( * ) Notice: Subject to any disclaimer, the term of this patent is extended or adjusted under 35 U.S.C. 154(b) by 725 days.

This patent is subject to a terminal disclaimer.

(21) Appl. No.: 15/840,912

(22) Filed: Dec. 13, 2017

(65) Prior Publication Data

US 2018/0101564 A1    Apr. 12, 2018

Related U.S. Application Data

(63) Continuation of application No. 14/514,136, filed on Oct. 14, 2014, now Pat. No. 9,858,312.

(51) Int. Cl.
*G06F 16/23* (2019.01)
*G06F 9/46* (2006.01)
*G06F 16/955* (2019.01)

(52) U.S. Cl.
CPC .......... *G06F 16/2365* (2019.01); *G06F 9/466* (2013.01); *G06F 16/955* (2019.01)

(58) Field of Classification Search
None
See application file for complete search history.

(56) References Cited

U.S. PATENT DOCUMENTS

| | | | |
|---|---|---|---|
| 6,154,847 | A | 11/2000 | Schofield et al. |
| 6,856,993 | B1 | 2/2005 | Verma et al. |
| 6,918,053 | B1 | 7/2005 | Thatte et al. |
| 7,290,056 | B1 | 10/2007 | McLaughlin, Jr. |
| 7,380,166 | B2 | 5/2008 | Thatte et al. |

(Continued)

FOREIGN PATENT DOCUMENTS

| | | |
|---|---|---|
| CN | 103020147 A | 4/2013 |
| JP | 2004295272 A | 10/2004 |
| JP | 2007011550 A | 1/2007 |

OTHER PUBLICATIONS

Hector Garcia-Molina et al., "Sagas," Department of Computer Science, Princeton University, 1987, pp. 249-259, Association for Computing Machinery.

(Continued)

*Primary Examiner* — Wilson Lee
(74) *Attorney, Agent, or Firm* — Womble Bond Dickinson (US) LLP

(57) ABSTRACT

A method including initiating a transaction comprising a plurality of data items in one or more data stores, wherein the transaction is to cause a change to at least a first data item of the plurality of data items. The method also including generating a first transactional data usable to undo the change to the first data item associated with the transaction, wherein the first transaction data comprises a serialized compensation data structure to undo the change to the first data item and complementary information regarding activities complementary to the undo operation.

20 Claims, 10 Drawing Sheets

(56) References Cited

U.S. PATENT DOCUMENTS

| | | | |
|---|---|---|---|
| 7,624,376 B1* | 11/2009 | Katzer | G06F 9/466 717/121 |
| 7,917,470 B2 | 3/2011 | Barnes et al. | |
| 7,921,220 B2 | 4/2011 | Barsness et al. | |
| 8,001,548 B2 | 8/2011 | Groff et al. | |
| 8,074,220 B2 | 12/2011 | Thole | |
| 8,903,779 B1 | 12/2014 | Holenstein et al. | |
| 9,501,312 B2 | 11/2016 | Little | |
| 9,858,312 B2* | 1/2018 | Robinson | G06F 16/2365 |
| 10,656,971 B2* | 5/2020 | Poon | G06F 9/54 |
| 2003/0200212 A1 | 10/2003 | Benson et al. | |
| 2003/0225563 A1 | 12/2003 | Gonos | |
| 2004/0268187 A1* | 12/2004 | Burke | G06F 8/38 714/40 |
| 2005/0021567 A1 | 1/2005 | Holenstein et al. | |
| 2005/0039041 A1 | 2/2005 | Shaw et al. | |
| 2006/0069926 A1 | 3/2006 | Ginter et al. | |
| 2006/0277024 A1* | 12/2006 | Kloppmann | G06Q 10/063 703/22 |
| 2009/0144750 A1 | 6/2009 | Little | |
| 2009/0217018 A1* | 8/2009 | Abrashkevich | G06F 11/1474 712/244 |
| 2012/0137304 A1* | 5/2012 | Boullery | G06F 9/54 719/313 |
| 2013/0339629 A1* | 12/2013 | Alexander | G06F 9/30087 711/144 |
| 2014/0149793 A1 | 5/2014 | Zaslavsky et al. | |
| 2014/0324785 A1* | 10/2014 | Gupta | G06F 16/2365 707/689 |
| 2015/0212850 A1 | 7/2015 | Little | |
| 2015/0370644 A1* | 12/2015 | Graefe | G06F 11/1469 707/624 |
| 2016/0314162 A1* | 10/2016 | Tarta | G06F 16/2336 |
| 2016/0371328 A1* | 12/2016 | Li | G06F 16/2282 |
| 2018/0004425 A1* | 1/2018 | Suzuki | G06F 11/3433 |

OTHER PUBLICATIONS

No Author, The Resource Manager, JBoss Development Guide, printed from the Internet on Sep. 23, 2014, 5 pages. Chapter 3, World Wide Web, http://docs.jboss.org/jbosstm/5.0.0.M1/guides/development_guide/ch03.html.

No Author, "Querying Multiple Databases Using One-Phase Capable JDBC Resources," Dive Technical in BPM, SOA, JAVA and More . . . , Jul. 5, 2013, 5 pages, World Wide Web, http://blog.soapplied.com/2013/07/querying-multiple-databases-using-one.html.

Manish Kishore, "EJB Programming & Troubleshooting: One Phase Capable Resource with Existing Two Phase Capable," Discussions from The Server Side, Mar. 21, 2005, 7 pages, World Wide Web, http://www.theserverside.com/discussions/thread.tss?thread_id=32756.

Can Türker et al., "How Can We Support Grid Transactions? Towards Peer-to-Peer Transaction Processing," Proceedings of the 2005 CIDR Conference, 2005, 12 pages, ETH Zurich, Institute of Information Systems, Zurich, Switzerland, World Wide Web, http://pdf.aminer.org/000/094/681/how_can_we_support_grid_transactions_towards_peer_to_peer.pdf.

Paul Robinson, "Bringing Transactional Guarantees to MongoDB: Part 1," JBoss Blogspot, May 28, 2014, pp. 1-2, World Wide Web, http://jbossts.blogspot.co.uk/2014/05/bringing-transactional-guarantees-to.html.

Antoine Girbal, "Perform Two Phase Commits," The MongoDB Cookbook, printed from the Internet on Sep. 23, 2014, 7 pages, World Wide Web, http://cookbook.mongodb.org/patterns/perform-two-phase-commits/.

Art Jolin, "Integrating WebSphere Extreme Scale Transactions with Other Transactions," May 9, 2012, pp. 1-17, IBM Corporation 2012, http://www.ibm.com/developerworks/websphere/techjournal/1205_jolin/1205_jolin.html.

Mark Little, Enlisting Multiple 1-Phase Aware Participants in the Same Transaction, 2 pages, retrieved from https://community.jboss.org/wiki/Multiple1PC on Jan. 30, 2014.

Using One-Phase and Two-Phase Commit Resources in the Same Transaction, 1 page, retrieved from http://pic.dhe.ibm.com/infocenter/wasinfo/v8r5/index.jsp?topic=%2Fcom.ibm.websphere.express.doc%2Flao%2tasks%2Ftla_ep.html on Jan. 30, 2014.

Optimization Using Single Phase Commit and Promotable Single Phase Notification, retrieved from http://msdn.microsoft.com/en-us/library/ms229980(v=vs.85).aspx on Dec. 16, 2013, 3 pages.

Mark Little, JUDCON JBoss Users & Developers Conference Boston: 2011, JBoss by Red Hat, Presentation, pp. 1-28, retrieved from https://www.jboss.org/dms/judcon/presentations/Boston2011/JUDConBoston2011_day2track3session1.pdf on Jan. 30, 2014.

Dr. Mark Little, A History of Extended Transactions, 26 pages, retrieved from http://www.infoq.com/articles/History-of-Extended-Transactions on Jan. 30, 2014.

* cited by examiner

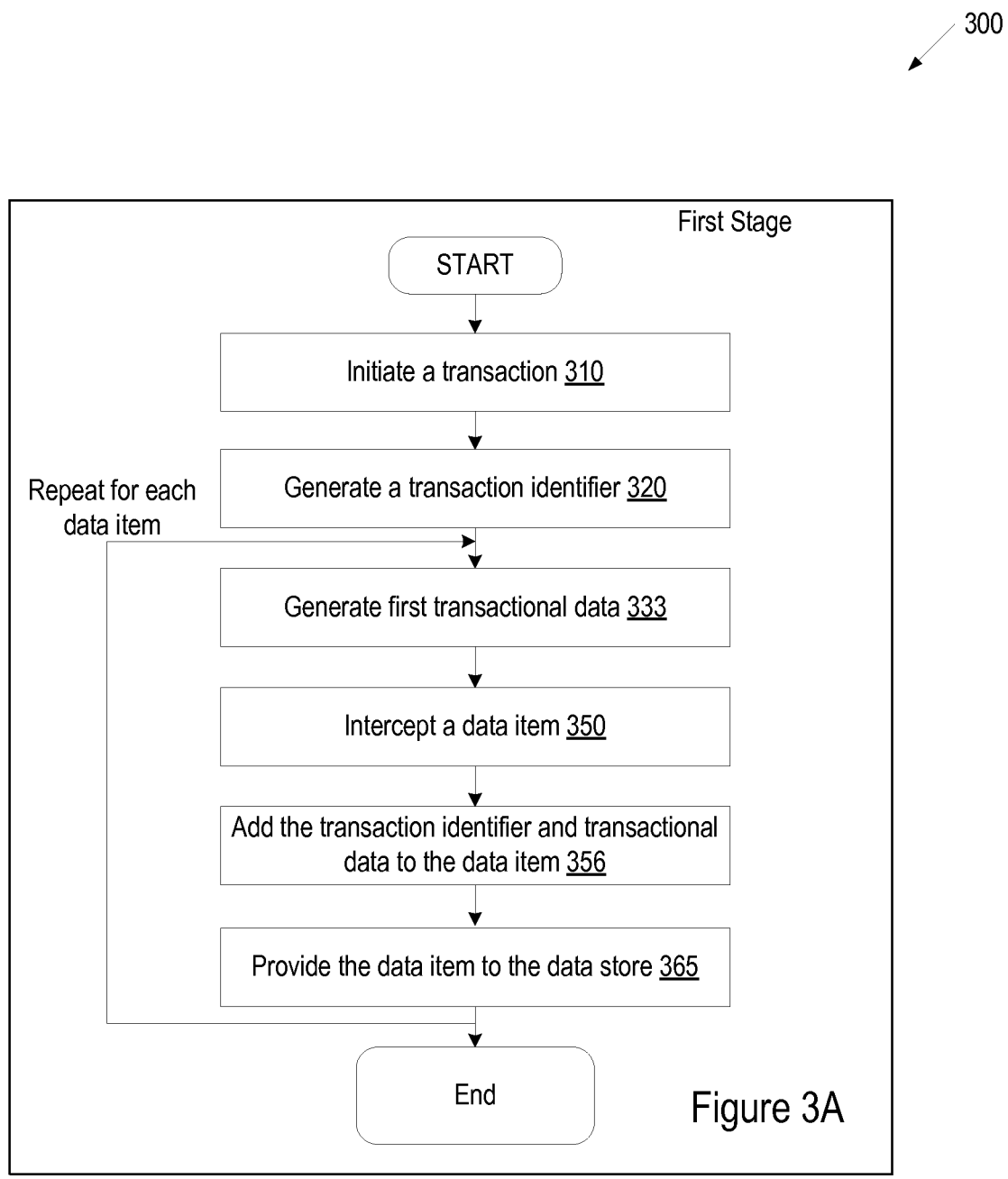

TRANSACTION COMPENSATION FOR SINGLE PHASE RESOURCES

REFERENCE TO RELATED APPLICATION

This application is a continuation of U.S. application Ser. No. 14/514,136, filed Oct. 14, 2014, the entire contents of which is hereby incorporated by reference.

TECHNICAL FIELD

Embodiments of the present invention relate to distributed transactions, and more specifically to a technique to update multiple resources within a transaction for both data stores that support two-phase commit transactions and data stores that fail to support two-phase commit transactions.

BACKGROUND

Distributed transactions are often performed on distributed computing systems. A distributed transaction is a set of operations that update shared objects. Distributed transactions preferably should satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property ensures that the transaction does not violate integrity constraints of the shared objects. The Isolation property ensures that intermediate effects of the transaction are not detectable to concurrent transactions. Finally, the Durability property ensures that changes to shared objects due to the transaction are permanent.

To ensure the Atomicity property, all participants of the distributed transaction must coordinate their actions so that they either unanimously abort or unanimously commit to the transaction. A two-phase commit protocol is commonly used to ensure Atomicity. Under the two-phase commit protocol, the distributed system implements the commit operation in two phases. In the first phase, a node in the distributed computing system managing the transaction asks all participants (nodes in the distributed computing system participating in the transaction) whether they are able to commit to the transaction. During the second phase, a coordinator node determines whether the transaction should be completed. If during the prepare phase all participant nodes committed to the transaction, the coordinator node successfully completes the transaction and sends commit messages to each of the participants. If during the prepare phase one or more participant nodes failed to commit to the transaction, the coordinator node does not complete the transaction and sends a roll back message to each of the participants.

The traditional two-phase commit protocol supports updating multiple resources. However, large scale systems, such as NoSQL data stores, do not support two-phase commit transactions due to other design considerations. During the first phase of a two-phase commit transaction, a lock is placed on the resource to be updated in order to ensure the Atomicity property, which can delay other system components that rely on a locked resource. Moreover, scalability of systems that use two-phase commit protocols is restricted due to the time it can take between the two phases and the requirement that participating resources recognize the two-phase commit protocol.

Other conventional distributed systems have implemented a one-phase commit protocol. A one-phase commit protocol does not use a prepare phase prior to committing resources to a transaction, and so may not satisfy the atomicity feature of the ACID properties if a resource is to modify more than one entity (e.g., more than one document or data item). The two-phase commit protocol provides strong consistency while the one-phase commit protocol provides high availability of resources.

BRIEF DESCRIPTION OF THE DRAWINGS

Embodiments of the present invention are illustrated by way of example, and not by way of limitation, in the figures of the accompanying drawings and in which:

FIG. 3A illustrates a flow diagram of an embodiment for a method of a first stage of a one-phase commit protocol that adds compensation data to data items in data stores;

DETAILED DESCRIPTION

Figure 1:
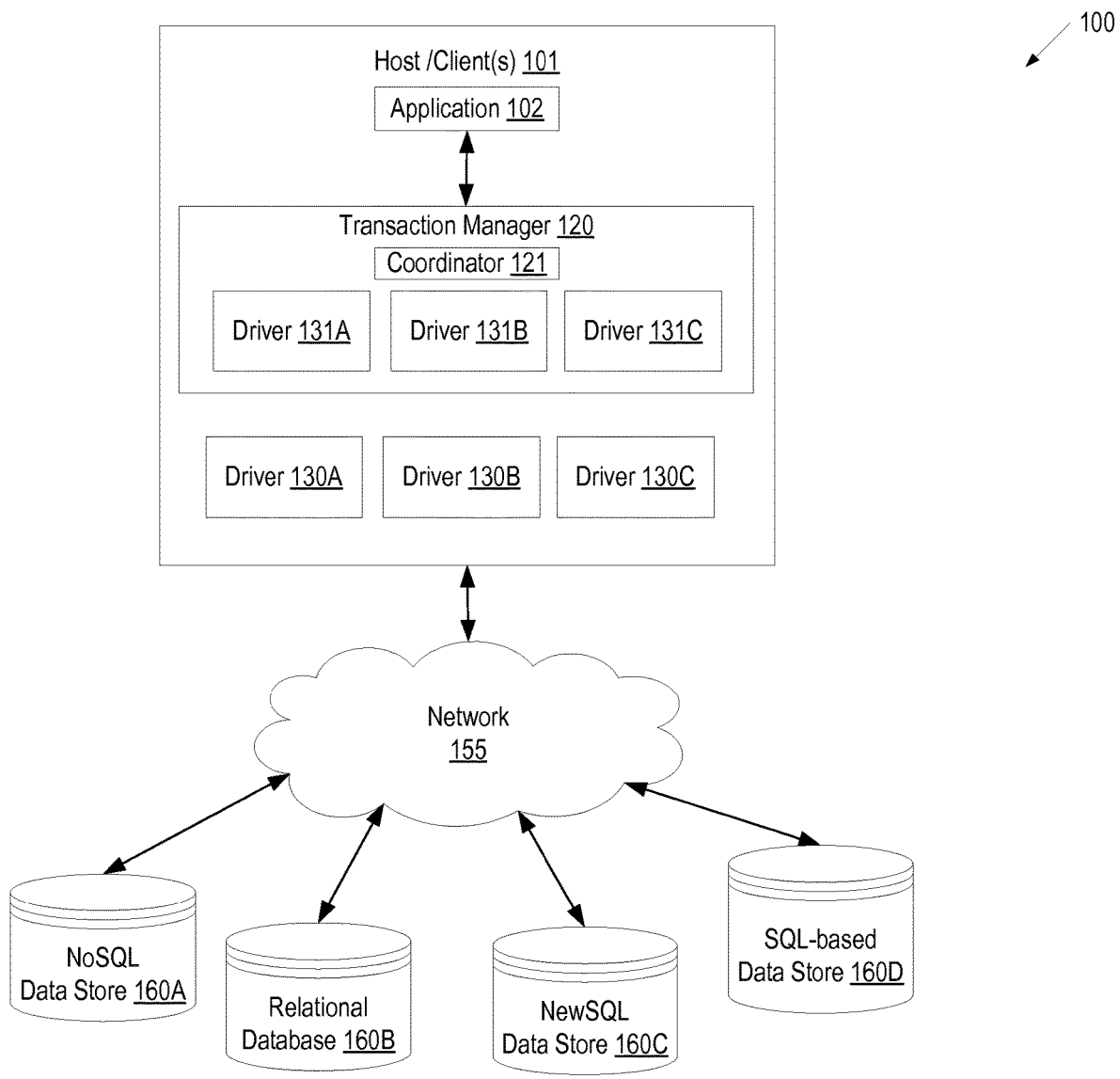
FIG. 1 illustrates an example of a distributed computing system, in which embodiments of the present invention may operate.

Described herein is a method and apparatus for implementing changes to multiple data items within a single distributed transaction using a one-phase commit technique. Specifically, rather than ensure consistency of distributed transactions through a two-phase commit protocol, a one-phase commit protocol is used with compensation data written with each data item update. That is, additional data is written into data items with data item updates that enable undoing changes made to the data items by the updates when cancellation or failure occurs.

A distributed transaction may include multiple data items from one or more data stores, which may be any one of several types of data stores commercially available. The distributed transaction may cause a change to at least a first data item of the multiple data items. The change may be represented as one or more data manipulation and/or definition statements that affect the at least one data item. A distributed transaction commit protocol as described in embodiments herein enables all the effects of the distributed transaction to persist, or none of the effects to persist, even though there may be a failure or error of any transaction participants or a transaction manager.

For example, a transaction may not complete (may be aborted or canceled) for various reasons. Aborts may be caused by a resource not being available, a concurrency conflict with another transaction, an application program might have detected errors, the transaction being explicitly canceled, and so on. Since multiple participants are involved in the distributed transaction, the distributed transaction is used so that the actions can be undone if the transaction cancels, aborts, or fails to complete.

Provided in embodiments herein is a scalable one-phase commit protocol that allows updating multiple data items in a single transaction with compatibility across different types of data stores. In one embodiment, the protocol includes two stages to ensure that all the changes to the multiple data items are made in a single transaction. The first stage creates a data structure for each data item, the data structure containing enough information so that the change can be undone during the second stage. The data structure created in the first stage of the protocol is serialized and written into the data item along with any changes to the data item caused by the transaction in an atomic-write operation that eliminates the possibility of a partial write. For example, data structures may be created for each data item and used to record any state changes to be applied to the data item. The data structures may be handlers of a transaction manager and written in the data items as part of an atomic update to the data stores. The second stage of the protocol may use the handlers and data created therefrom that is stored in the data items to undo the changes of each data item. The transaction manager may also implement recovery to undo changes made to data items by a transaction and/or to remove transactional information added to the data items in response to the transaction not completing successfully.

The scalable one-phase commit protocol can be implemented at the middleware layer of the Open Systems Interconnection (OSI) model and provide compatibility with various types of data stores. Middleware provides services to software applications beyond those of the operating system and enables communication and management of data in distributed applications. By implementing the one-phase commit protocol at the middleware layer, transactions may be implemented without changing applications that trigger or participate in the transactions. Traditionally large scale data stores have not provided this functionality.

FIG. 1 illustrates an example distributed computing system 100, in which embodiments of the present invention may operate. The distributed computing system 100 may include a service oriented architecture (SOA) (an information system architecture that organizes and uses distributed capabilities (services) for one or more applications). A SOA provides a uniform means to offer, discover, interact with and use capabilities (services) distributed over a network. Through the SOA, applications may be designed that combine loosely coupled and interoperable services.

In an embodiment, the distributed computing system 100 includes one or more hosts or clients 101, one or more applications 102, a transaction manager 120, and one or more data stores 160A-D, which may be connected via a network 155. Network 155 may be a private network (e.g., a local area network (LAN), wide area network (WAN), etc.), a public network (e.g., the Internet), or a combination of a private network and a public network. Alternatively, the distributed computing system may include a single server and/or client 101 may be directly connected with the one or more data stores 160A-D.

Hosts or client(s) 101 may be, for example, personal computers (PC), palm-sized computing devices, personal digital assistants (PDA), etc. Client(s) 101 may also be applications that run on a PC, server, database, etc. In the SOA, client(s) 101 may include applications 102 that access services. Client(s) 101 may communicate directly or through network 155 with the transaction manager 120 to change data items of the data stores 160A-D.

In an embodiment, the client 101 includes an application 102. Application 102 may initiate a transaction to request changes to multiple data items in the data stores 160A-D. Application 102 may notify the transaction manager 120 of the participants (e.g., of data items that will be modified by the transaction) and/or other applications that implement operations in association with the transaction. Application 102 may also send the transaction manager 120 instructions for confirming and completing the transaction. In a distributed computer system 100, an application 102 may be, for example, a plane ticket reservation booking application, group appointment scheduling application, or document managing application among others.

Data stores 160A-D may include a file system, a database, or other data storage arrangement. Examples of databases include databases that use structured query language (SQL), not only SQL (NoSQL) databases, and relational databases. A data item may be a document, record, data structure, or any type item stored in a data store. This novel technique allows multiple data items to be changed within a transaction across different types of data stores.

The transaction manager 120 is a software module that may include a coordinator 121 that coordinates multiple participants during a distributed transaction. A participant may be another transaction manager, a local resource manager, client 101, application 102, or data stores 160A-D. Coordinating a distributed transaction may include facilitating compatibility and cooperation between participants, determining participation in a transaction, determining which participants are able to commit or roll back a transaction, committing or rolling back a transaction, and so on. In one example, the transaction manager 120 generates data structures that set forth business logic identifying the changes made to data items by a transaction and add data (e.g., compensation data or confirmation data) from these data structures to the data items along with implementing the actual changes to the data item. Accordingly, changes made to a data item and transactional information sufficient to undo these changes and/or complete these changes may be written to the data item in a data store atomically. When a transaction roll back occurs, the transactional information may be used to implement a compensation action that undoes the changes to the data items caused by the transaction. This is discussed in greater detail below with reference to FIG. 2.

Returning to FIG. 1, as mentioned, coordinator 121 of the transaction manager 120 may act to coordinate updates to data items in multiple data stores 160A-D. A resource manager is a software module that manages a persistent and stable storage system. Examples of resource managers include databases and file managers. The host/client 101 may include multiple drivers 130A-C, each of which may be considered as a resource manager that interfaces with a particular data store 160A-D or a particular type of data store. Drivers 130A-C enable the transaction manager 120 and applications 120 to connect to various types of data stores to provide data operations.

Transaction manager 120 may additionally include drivers 131A-C in one embodiment. Drivers 131A-C may be proxy drivers for drivers 130A-C, respectively. Drivers 131A-C may receive or intercept data items from application 101. Drivers 131A-C may then modify the data items as described herein (e.g., by adding or removing transactional information to the data items), and then provide the modified data items to an appropriate driver 130A-C.

In an implementation, the type of data store in the one or more data stores 160A-D is indistinguishable from other data stores 160A-D to users and client applications 102. Therefore, client applications 102 may use conventional database formats, protocols and semantics for communicating with the data stores 160A-D. The transaction manager 120 may include drivers 131A-C that may act as a proxy to facilitate operations between the participants and the data stores 160A-D. For example, client applications 102 may communicate with the data store 160A via drivers 131A-C and drivers 130A-C using the memcached protocol, the REST protocol, the OData protocol, the Websockets protocol, the SQL protocol, etc. For example, the data stores 160A-D have application programming interfaces (API) to facilitate compatibility. A client 101 may communicate with any data store 160A-D to access stored data using a driver that interfaces with that data store. A data store 160A-D may receive database commands, such as commands to store objects, to retrieve objects, to implement searches, etc. To enable communication with data stores 160A-D implemented for different protocols, the host/client 101 may include multiple different drivers 130A-C. Each driver 130A-C may be used to translate objects and requests into the specific formats used by the data stores 160A-D. Each driver 130A-C may include rules on how to translate an incoming protocol into a protocol used by the data stores 160A-D, and how to translate responses going out from the protocol used by the data stores 160A-D into the protocol used by the client application 102.

Figure 2:
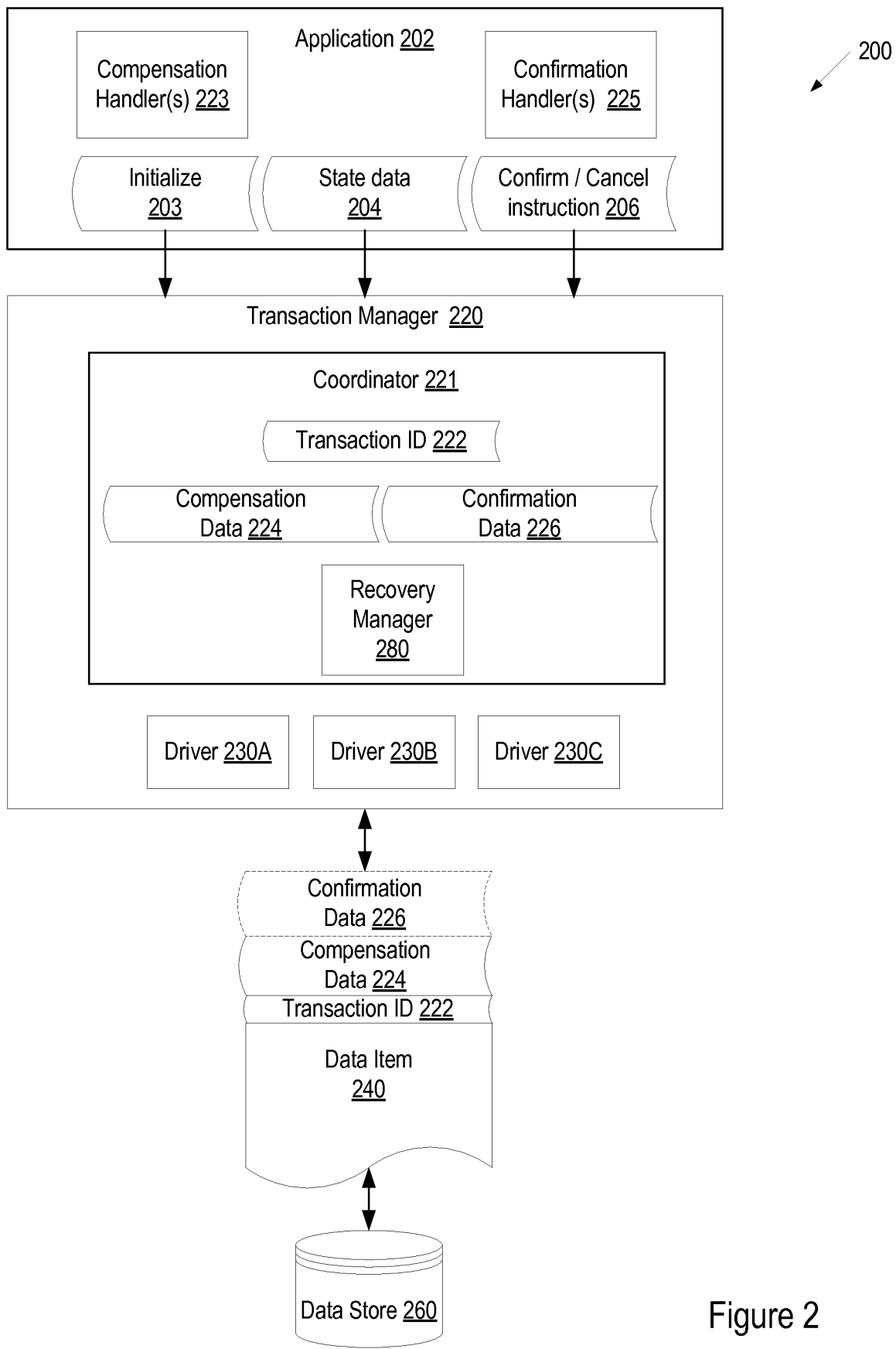
FIG. 2 illustrates a block diagram of a transaction manager that uses a driver to update a data store, in accordance with an embodiment of the present invention.

FIG. 2 is a block diagram illustrating a participant in an example distributed transaction 200. In FIG. 2, an application 202 initiates a transaction, which causes a transaction manager 220 to be invoked. The transaction manager 220 determines updates to one or more data items (e.g., data item 240), and stores the data items in one or more data stores (e.g., data store 260). Transaction manager 220 may coordinate a distributed transaction for one or more application(s) 202, where the transaction may include multiple data items 240 in one or more data stores 260. The transaction may be a one-phase commit transaction that uses compensation handlers 223 and/or confirmation handlers 225 to undo and/or confirm the transaction.

The transaction manager 220 may receive a request (e.g., from a client or client application 202) to initialize a new transaction 203 and an instruction to confirm or cancel the transaction 206. The transaction manager 220 may include a coordinator 221 and one or more drivers 230A-C. The coordinator 221 may initiate a new transaction and generate a new unique transaction identifier (ID) 222 for the new transaction. Coordinator 221 may be part of the transaction manager 220 (as shown) or may be a separate component from the transaction manager 220. Various techniques may be employed for generating a transaction ID 222.

The transaction manager may change a single data item 240 of a data store 260 or multiple data items from multiple data stores as part of a single transaction. The transaction ID 222 is used to uniquely identify the transaction. The transaction ID 222 is added to each data item 240 changed as a result of the transaction. This is discussed in greater detail below with reference to FIGS. 3-5.

Since multiple clients and/or resources may participate in a transaction, the new transaction has a transaction context for providing an association between transactional operations on the participant resources and the clients or services invoking those operations. The transaction context is associated with the transaction identifier 222. The transaction ID 222 can be sent to the entity (e.g., client application 202) that requested the transaction. The requestor may notify transaction manager 220 of the participants (e.g., of data items that will be modified by the transaction) and/or other applications that implement operations in association with the transaction, and transaction manager 220 may send the transaction identifier to each of the identified participants. Alternatively, the requestor (e.g., client application 202) may send the transaction identifier to each entity (e.g., additional client, application, resource manager, etc.) that may be a participant to the transaction.

The coordinator 221 enables customization of compensation actions, data structure generation, data flow, and coordination of compensation actions. In one embodiment, coordinator 221 executes a compensation handler 223 and/or a confirmation handler 225 for each data item to be changed by the transaction. In one implementation, handlers (e.g., compensation handler 223 and/or a confirmation handler 225) may be part of the application 202 and initiated or loaded to be run by the transaction manager 220. As discussed below, compensation handlers 223 may be initialized in a first stage and may be invoked in a second stage of a transaction in response to a request to cancel the transaction or by a recovery manager 280 during recovery of the transaction (if the transaction failed). The compensation handler 223 may modify a particular data item 240 to undo changes made to that data item by the transaction. The compensation handler 223 may contain business logic to perform roll back operations or alternative contingency actions for the data item 240.

Confirmation handlers 225 may also be initialized during the first stage and invoked in the second stage in the event that the transaction completes successfully. The confirmation handler 225 may contain business logic to complete the transaction and operations that complement confirmation of the change to the data item(s).

Recovery manager 280 may be used to implement a recovery process for compensation, confirmation, and/or cleanup operations if triggered such as where transaction manager 120 does not receive an instruction to trigger the second stage and the transaction does not complete successfully.

Figure 3B:
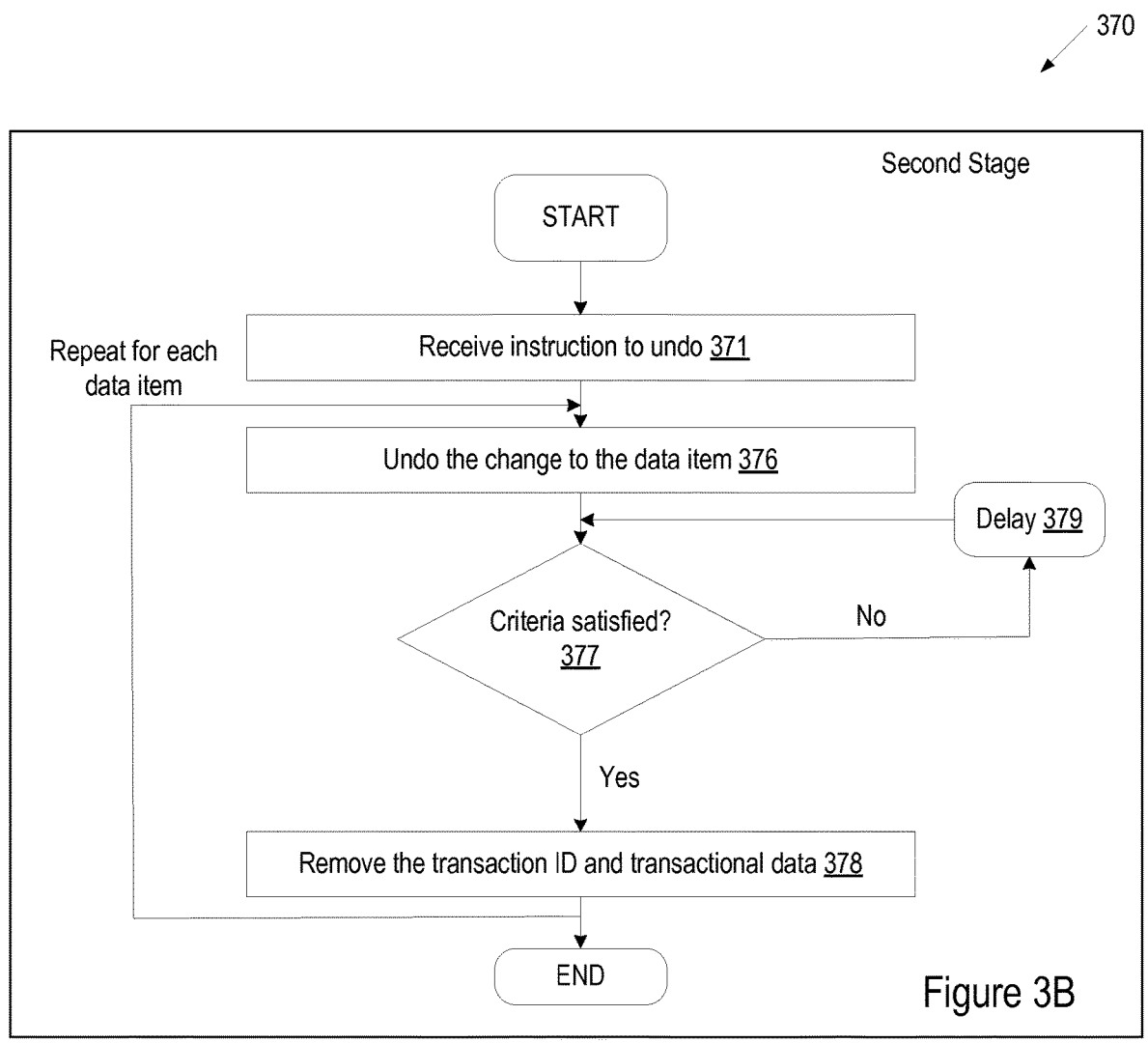
FIG. 3B illustrates a flow diagram of an embodiment for a method of a second stage of the one-phase commit protocol.
Figure 7:
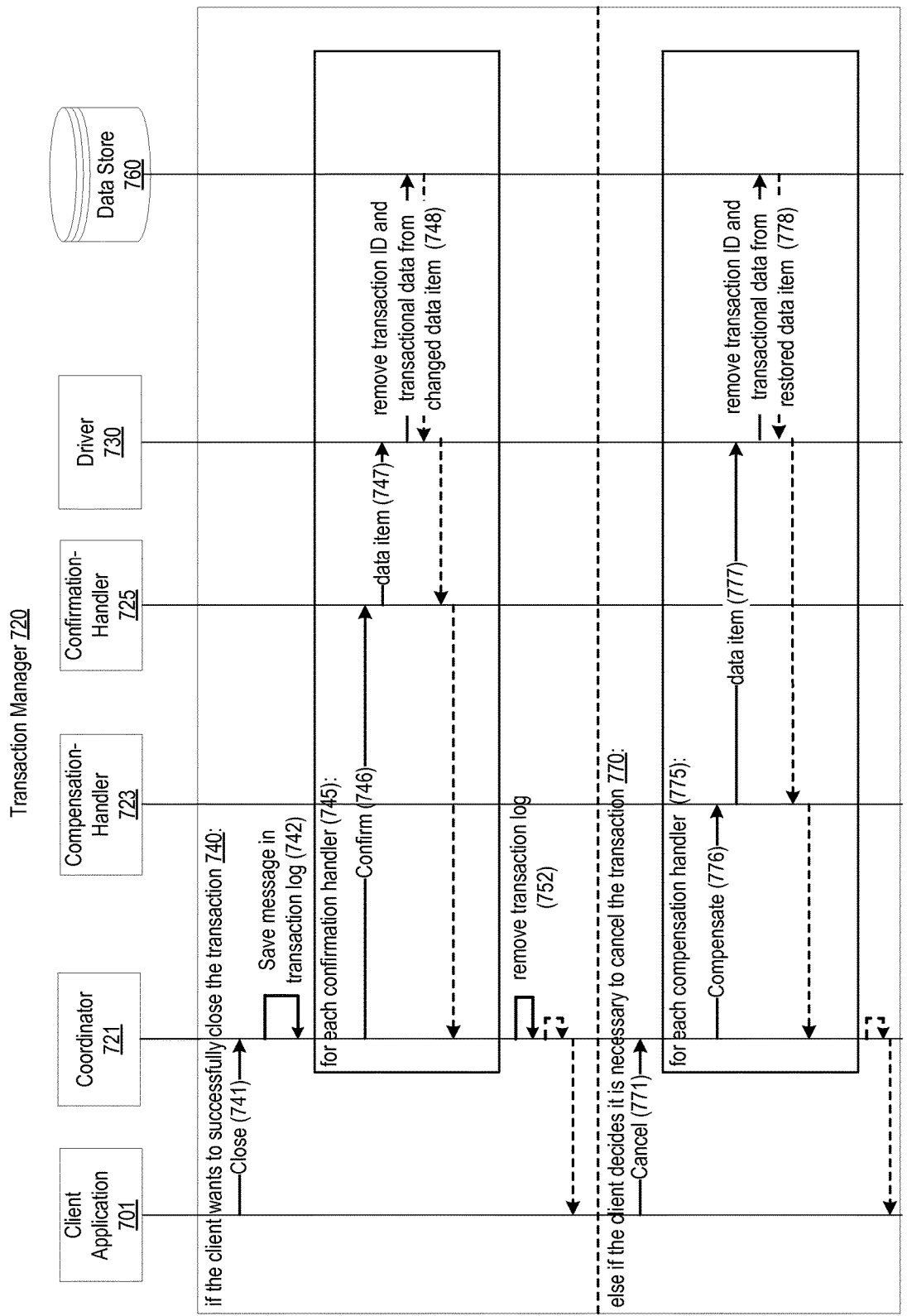
FIG. 7 illustrates a sequence diagram of an example of a transaction manager supporting the completion stage in accordance with an embodiment of the present invention.

Detailed discussion of the second stage (in which a transaction is confirmed or undone and/or transactional information is removed from data items) is provided in reference to FIGS. 3B and 7. Recovery manager 280 is discussed with reference to FIG. 8.

The compensation handling framework described herein provides support for coordinating the invocation of compensation handlers 223 and/or confirmation handlers 225 in response to instructions, aborts, failures, or successful transaction completion.

Transaction manager 220 may include a different driver 230A-C for each type of data store that transaction manager 220 interfaces with. For example, transaction manager 220 may include a MongoDB® driver, a Hadoop® driver, an Oracle® driver, and so on. These various drivers are represented by drivers 230A-C. However, it should be understood that transaction manager 220 may include more or fewer drivers for use with various types of data stores. Each driver 230A-C contains the application programming interface (APIs) used by standard drivers provided for communication with the data stores. Thus, application 202 may invoke the drivers 230A-C to store and retrieve data items to the data stores. However, drivers 230A-C may be proxies that interface with additional drivers (not shown) that actually interface with the data stores. Drivers 230A-C may each add and remove transactional data to a received data item and attach, insert, strip, and/or filter the transactional data into the data item. The driver 230A-C may then pass the modified data item on to the additional driver that communicates with the data store.

Compensation handler(s) 223 use the state data(s) 204 provided by a requestor (e.g., application 202) to develop compensation data 224 that are usable to undo changes to the data item(s) associated with the transaction. The provided state data 204 may include business logic that is sufficient to identify what change was made by the transaction and/or how to undo the change. The coordinator 221 may invoke the compensation handler(s) 223 to be used in an event where the transaction does not complete successfully (e.g., cancel or abort).

The state data 204 received from the requestor (e.g., application 202) may include information in addition to what is used to return data item 240 to its previous state. Such additional information may include information that can be used to complement the compensation event. For example, the state data 204 may further include information regarding a characteristic of the state data 204, activities such as notifying third party systems that the contents of the data item are available, behaviors such as sending error or cancellation messages, or logic to provide information to the requestor.

It is noted the term "change" as used herein may include operations such as building or creating a data item as well as updating a data item, modifying a data item, or overwriting a data item. The term "undo" as used herein may include operations such as un-creating or deleting a data item as well as updating a data item, modifying a data item, or overwriting a data item. Undoing a change may reverse the change or include additional logic or operations to undo the changes.

Coordinator 221 may create a compensation data 224 from a particular compensation handler 223 that can be used to undo changes to a particular data item caused by a transaction. As discussed in reference to FIGS. 3A-B, this may include various serialization or data transformation techniques. For example, coordinator 221 may serialize the compensation handler 223 into the compensation data 224.

Compensation data 224 and the transaction ID 222 are added to data item 240 by a driver (e.g., driver 230A). The data item 240, including the transaction ID 222 and the compensation data 224, may then be written to data store 260. In one implementation, the transaction ID is written to the data store 260 with the data item 240 in such a way that it may be identifiable with minimal processing cost. As mentioned, if the overall transaction is canceled in the second stage or fails to complete successfully then the compensation handler(s) 223 undo any changes made to data item 240 for the transaction. The driver (e.g., driver 230A) may also remove (e.g., update, delete, strip, and/or filter) the transaction ID 222 and any added transactional data (e.g., compensation data 224, confirmations data 226) from the data item 240. Optimization of the removal is discussed with reference to FIGS. 3B and 7.

In one embodiment, coordinator 221 may create a confirmation data 226 from a particular confirmation handler 225 that can be used in the event of a successful transaction. A default or prearranged confirmation data 226 may be generated. The single transaction completing successfully has uniform commitment and therefore may or may not have additional information in the event of confirmation. However, coordinator 221 may also use provided state data 204 to create confirmation handler(s) 225 similar to the compensation handler(s) 223.

Confirmation handler(s) 225 use the state data(s) 204 provided by a requestor (e.g., application 202) to develop confirmation data(s) 226 that are usable to confirm changes to the data item(s) associated with the transaction. The provided state data 204 may include business logic that is sufficient to identify what change was made by the transaction and/or how to confirm the change. The coordinator 221 may invoke the confirmation handler(s) 225 to be used in an event where the transaction is confirmed to complete successfully.

The state data 204 received from the requestor (e.g., application 202) may include information in addition to what is to be used to confirm the change to data item 240. Such additional information may include information that can be used to complement the confirmation event. The state data 204 received from the requestor (e.g., application 202) may include information that may be used to complement a confirmation event.

For example, the state data 204 may further include information regarding a characteristic of the state data 204, activities such as notifying a third party system that a change was completed, behaviors such as charging a change fee, or business logic to return trigger action by the requestor. Coordinator 221 may also create the confirmation data 226 from a particular confirmation handler 225 that can be used to confirm changes to a particular data item caused by a transaction.

In addition to the compensation data 224 and the transaction ID 222, the confirmation data 226 may be added to data item 240 by a driver (e.g., driver 230A). The transaction manager 220, via the coordinator 221 or driver 230A-C, may prepare the confirmation data 226 to be added to and removed from the data item 240. As discussed herein and in reference to FIG. 4, this may include various serialization or data transformation techniques. If the overall transaction is confirmed or recovers successfully, the confirmation handlers may be executed for each data item 240 as discussed in FIGS. 7 and 8.

FIG. 3A illustrates a flow diagram of an example of a compensation method 300 depicting creating a first transactional data (e.g., confirmation data) to be added with an atomic update to a first data item of multiple data items in one or more data stores, wherein a transaction is to cause a change to at least a first data item of the multiple data items. FIG. 3B illustrates a flow diagram of an example of a second stage of a compensation method 370 that may be used to undo the changes made in the first stage. The methods 300, 370 are implemented by processing logic that includes hardware (e.g., circuitry, dedicated logic, programmable logic, microcode, etc.), software (such as instructions run on a processing device), or a combination thereof. In one implementation, the methods 300, 370 are implemented by a transaction manager running on a computing device (e.g., transaction manager 120 of FIG. 1).

Referring to FIG. 3A, at block 310 of method 300, a requestor may initiate a transaction. As discussed above, a transaction ID is generated at block 320. Then for each data item to be changed, a first transactional data is generated at block 333. The first transactional data may contain at least the compensation information sufficient to undo a change to the data item. In one embodiment, the first transactional data is a serialized version of a compensation data structure or confirmation data structure. The first transactional data may also include information that may be used to complement the compensation event such as business logic or messaging instructions.

Preparation of the first transactional data may include, as discussed herein, various data transformation techniques applied to a compensation handler and/or confirmation handler to create the transactional data. Such data transformation techniques may include serialization, dehydration, or marshaling. Transforming the compensation handler and/or confirmation handler into the transactional data may provide performance or resource savings. For example, serialization is the process of converting an object state into a format that can be stored or transmitted across a network connection link. The series of bits (e.g., a file) that the objects have been serialized into can later be reread according to the serialization format to create a semantically identical clone of the original object. A structured data detector may reverse the serialization process to load the data. The process of converting a complex object into a sequence of bytes is generally referred to as marshaling. The transactional data may be restructured, de-serialized, or reconstructed when used, as discussed in reference to FIGS. 3B and 8.

The process proceeds to block 350, where the data item is intercepted prior to being changed in the data store. In one embodiment, the data item is intercepted by exposing a driver to a client application. The client application may invoke the driver and provide the driver with a data item to be written to a data store. The driver may be a proxy for another driver that interfaces with the data store.

At block 356, the first transactional data may be added to the data item. In one embodiment, the first transactional data is written into a body of the data item. Alternatively, or additionally, the first transactional data may be written as metadata attached to the data item. In the case of a data item in a relational database, the transactional data may be added to a new transactional data field that is related to other fields of the data item.

Adding the transactional data (e.g., the serialized confirmation handler and/or serialized compensation handler) that may be used to recreate a compensation handler data structure and/or a confirmation handler data structure to the data item enables the process to be carried out in a single distributed transaction using a one-phase commit with relaxed ACID properties, namely Isolation and Consistency, while still maintaining robust performance and scalability.

At block 365, processing logic provides the first data item to a first data store, which may be one of multiple data stores that include data items updated in the transaction. The first data item, including the transaction ID and first transactional data, is provided in an atomic update to the data store. That is, the update will either be completely successful or fail completely. This guarantees that if the data item is written to the data store, the transactional data is also written to the data store and is therefore available during the second stage. Thus, partial writes are eliminated. The processing logic repeats the operations of blocks 333, 350, 356, 365 for each data item to be modified by the transaction. Thus, at the end of the first stage each changed data item in a single transaction includes the same transaction ID and a customized transactional data for undoing the changes made to that data item as a result of the transaction.

Referring to FIG. 3B, the second stage, as represented in method 370, may be triggered by an instruction from the requestor to cancel the transaction. At block 371, the processing logic receives an instruction from the requestor to undo the changes to a data item. At block 376, a compensation handler is invoked to undo the changes made to the data item by the transaction. The data item changes are undone in view of compensation instructions in the compensation handler that are specific to the transaction and to the data item. These compensation instructions mirror compensation instructions included in the first transactional data added by the operation at block 356 of method 300. The undo operation is implemented to reverse changes made to the data item as a result of the transaction. Additionally, compensation handler 376 may include alternative actions or logic to undo changes that cannot be reversed.

At block 377, processing logic implements a check of criteria of the compensation and/or confirmation handlers and/or transactional data to see if one or more data item clean-up criteria are satisfied. The criteria may be in view of contents of the added data, data item, system resources, or processing logic. For example, the checked criteria of the transactional data may determine the size of the added data or transactional data as a whole is not below a certain threshold or percentage. In another example, certain types of changes or categories of data items may be deprioritized and/or delayed.

The removal of the added data at block 378 may be asynchronous to or delayed from the operation at block 376 or process 370. For example, when the compensation and/or confirmation handlers do not change the data item during the first phase, removal of the added data may be delayed to optimize the transaction. An implementation may provide the data item back to the data store with the changes undone and the data item including added data. The added data may be removed through asynchronous, delayed, batch, and/or filter operations. In another example, the processing logic may delay the removal to process as a batch operation prior to the transaction closing, wait until the system is idle, or in view of monitored storage capacity. In one implementation, processing logic might remove added data in the next block for a data item with less than ten percent available memory, while for other data items, the processing logic may delay removal until a number of data items have undone changes.

Alternatively, processing logic may be provided to trigger cleanup or filter the added data from the data item when next requested from the data store. For example, when an application requests a data item that processed at block 376 to undo changes but has yet to process at block 378 to remove the added data, a cleanup operation such as a filter may remove the added data for the requesting application. Method 370 may be implemented for each data item associated with a canceled transaction.

If one or more criteria are satisfied, the process continues to block 378. Otherwise, the process proceeds to block 379 and processing logic delays before again checking if any of the criteria are satisfied. Alternatively, the process may end if the criteria are not satisfied or proceed to repeat blocks 376, 377, 378, and/or 379 for each data items of the transaction. At block 378, processing logic removes the transaction ID and transactional data(s) from the data item.

Removal at block 378 of the transaction ID and the first transactional data previously added is implemented to cleanup the data item. Cleanup ensures the data item may be used successfully by other applications and in other transactions. The removal of the transaction ID and transactional data may be accounted for in various embodiments.

In some instances, at block 377 the criteria may be criteria that, if satisfied, trigger immediate or quick performance of the operations of block 378. For instance, the operations at block 378 to remove the transaction ID and transactional data (e.g., serialized data structure) from the data item may be done synchronously, in tandem, sequentially, or tied to operations of undoing the change to the data item at block 376. For example, the customized data structure may include operations that are to be implemented to complement the compensation event. In such an instance, it may be beneficial to implement the complementary operations in sequence with the compensation action.

Figure 4:
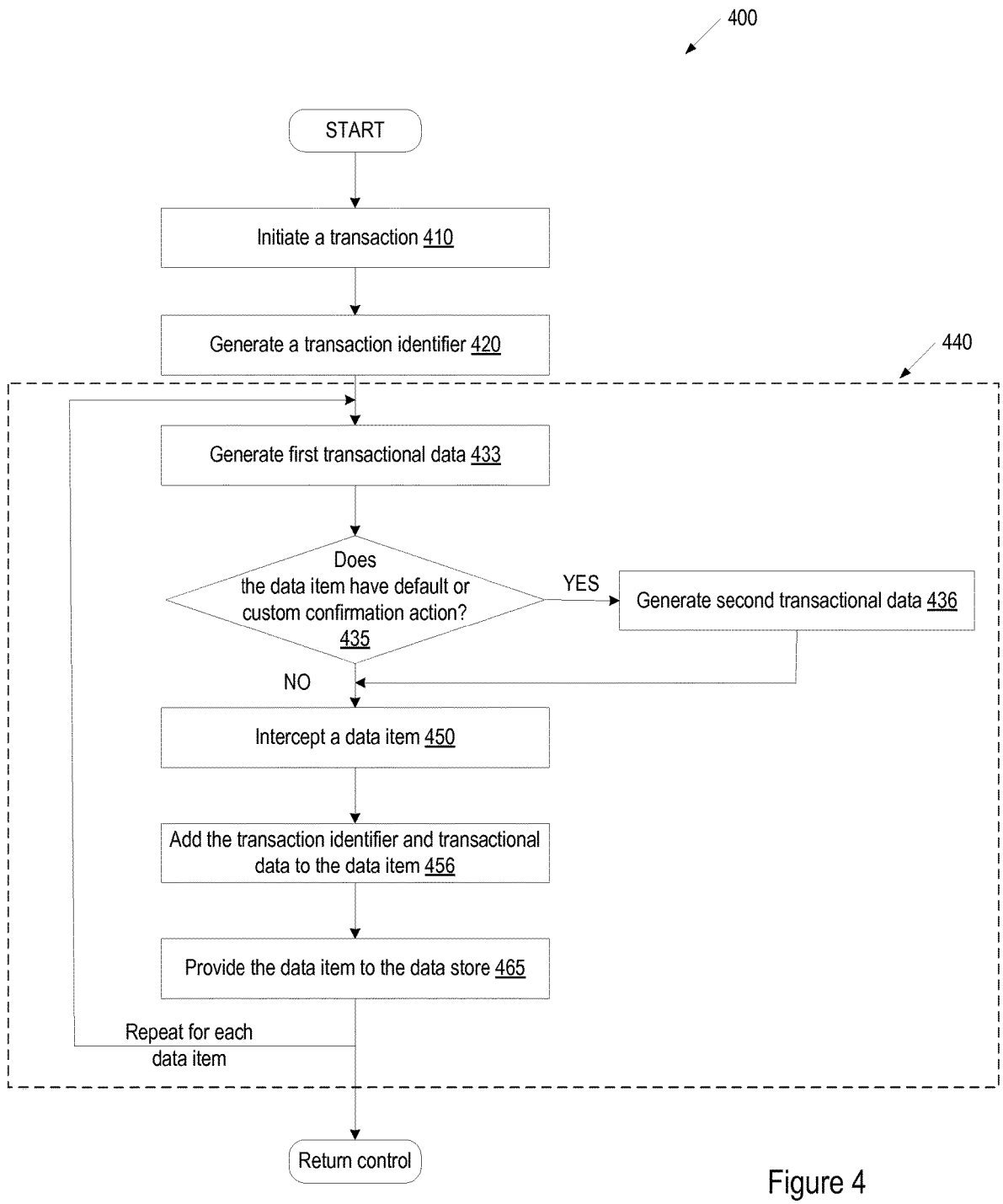
FIG. 4 illustrates a flow diagram of an embodiment for a method of managing changes to multiple data items using an inline atomic-write technique.

FIG. 4 illustrates a flow diagram of one implementation for a method 400 of generating confirmation data structures and adding them to data items for storage in data stores as part of a transaction. Method 400 may be implemented by processing logic that includes hardware (e.g., circuitry, dedicated logic, programmable logic, microcode, etc.), software (such as instructions run on a processing device), or a combination thereof. In one implementation, method 400 is performed by a transaction manager running on a computing device (e.g., transaction manager 120 of FIG. 1).

Referring to FIG. 4, at block 410 of method 400, a requestor may initiate a transaction. A transaction ID for the transaction is generated at block 420. Then for each data item to be changed, the operations of block 440 are implemented including the operations of blocks 433 through 465. At block 433, processing logic generates a first transactional data. The first transactional data may be compensation data that contains at least the compensation information sufficient to undo a change to the data item. The compensation data may be generated from a compensation handler and may be a serialized version of a compensation handler object.

At block 435, processing logic determines whether to generate second transactional data for a confirmation action. For example, a single transaction completing successfully has uniform commitment and thus may or may not use additional information for a confirmation action. At block 435, the processing logic may determine that without additional information second transactional data is not to be generated and, and the method proceeds to block 450. In another example, processing logic at block 435 may determine to generate second transactional data at block 436 based on default, prearranged, or custom information for a confirmation operation. In this example, the implementation proceeds to block 436 to generate second transactional data.

If second transactional data (referred to as a confirmation data) is to be generated at block 436, as discussed in reference to FIG. 2, confirmation handler(s) may be used to generate second transactional data to contain data to be used in the event of a successful transaction. The second transactional data contains confirmation data that is sufficient to complete the transaction and clean up a data item (e.g., remove any transactional information from the data item) and potentially to implement additional actions associated with confirmation of the transaction.

In one example, default or prearranged confirmation data may be applied for confirmation operations of all data items of the transaction. In another example, custom information (e.g., state data) received from the requestor (e.g., application) may contain information that may complement a confirmation event. In an example of a reservation booking, the confirmation operation may calculate a fee, send a confirmation message, or notify other systems that one less spot of the type confirmed is available for booking. That is, confirmation handler(s) may also use confirmation state data(s) if provided by a requestor (e.g., application) to create confirmation data similar to the compensation sequence discussed in FIG. 3. However, the second confirmation data(s) can contain default or prearranged data that is usable in the event all the changes to the data item(s) associated with the transaction complete successfully.

Since a single transaction completing successfully has uniform commitment, it might not use additional information for a confirmation action, the process may proceed block 450 without generating second transactional data.

At block 450, a data item is intercepted prior to being written to a data store. At block 456, the transaction identifier and transactional data may be added to the data item. The transactional data and transactional ID may be written into a body of the data item and/or as metadata attached to the data item. In the case of a data item in a relational database, the transactional data may be added to a new transactional data field that is related to other fields of the data item.

At block 465, processing logic provides the data item to a data store. In one embodiment, the data item, including the transaction ID, the first transactional data (e.g., serialized compensation data structure), and/or second transactional data (e.g., serialized confirmation data structure), is provided in an atomic update to the data store. The update will either be completely successful or fail. This guarantees that the first and second transactional data are available for implementing confirmation or compensation operations.

Figure 5:
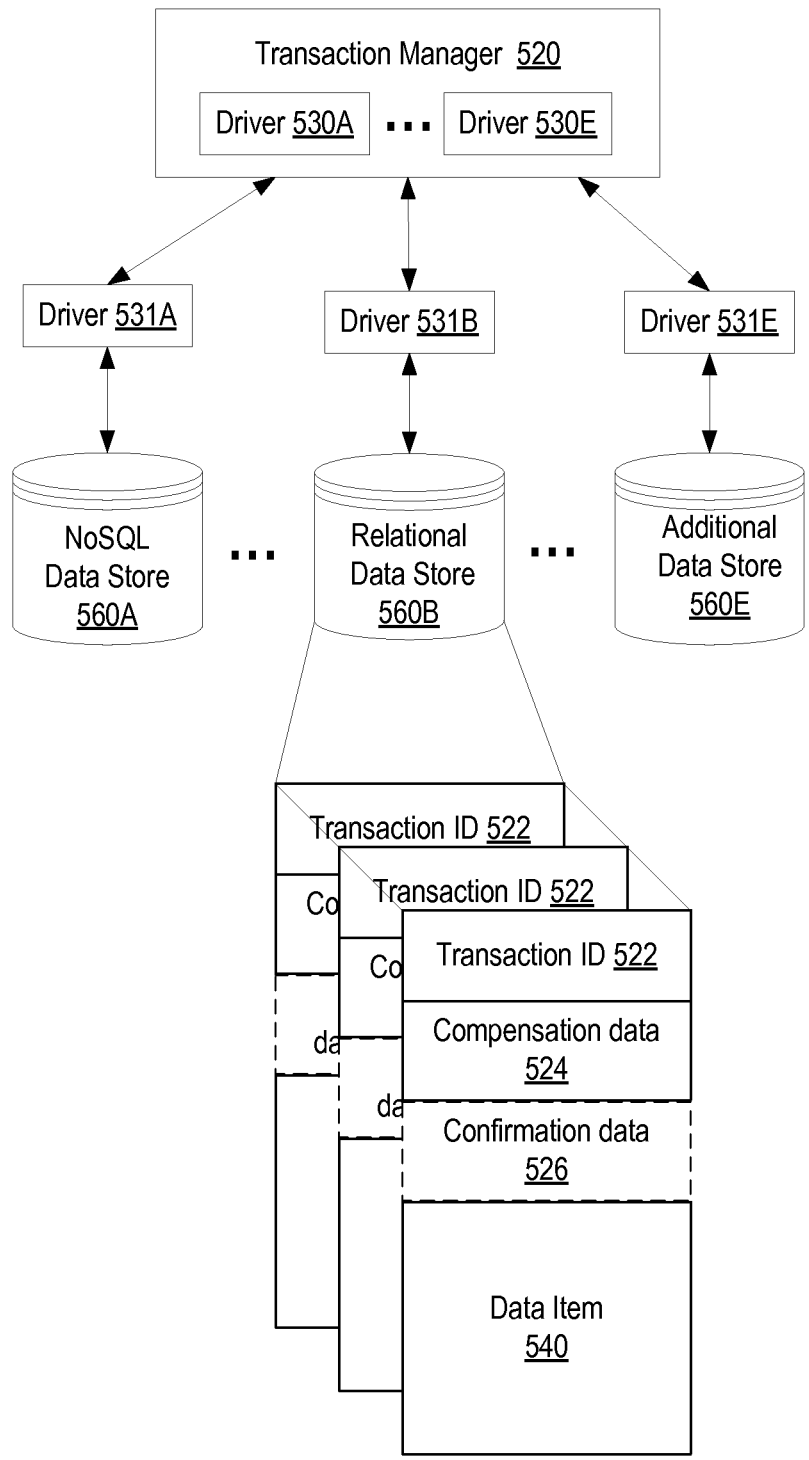
FIG. 5 illustrates a block diagram of an embodiment for manipulating a data item.

FIG. 5 illustrates a block diagram of an embodiment for assembling a data item 540. A transaction manager 520 coordinates interactions with multiple of data stores 560A-E to implement changes to multiple data items. To ensure that these changes can be reversed if a transaction is canceled, changes to data items 540 may include the addition of compensation data 524. Additionally, confirmation data 526 may be added to the data items 540. The confirmation data 526, compensation data 524 and a transaction ID 522 may be added to the data item 540 and written along with changes to the data item in a single one-phase commit transaction. In one embodiment, transaction manager 520 includes a separate driver 530A-E for each of the data stores. The drivers 530A-E may intercept the data item before it is written to a data store (e.g., to data store 560B), and may insert the transaction ID 522, compensation data 524 and confirmation data 526 into the data item 540 before forwarding the modified data item 540 on to the data store 560B or to another driver 531A-E that interfaces with the data store 560B. Accordingly, the data item 540 stored in the data store 560B includes the data item 540, the transaction ID 522, the compensation data 524, and/or the confirmation data 526. In one implementation, data store 560B, formatted in a relational database format, may store additional transactional data in a different row or different table from data item 540 in the data store 560B during the first stage. Then other participants of a distributed system may access the data item 540 and intermediate effects of the transaction on concurrent transactions are reduced.

A data store 560A-E may receive database commands, such as commands to store objects, to retrieve objects, to perform searches, etc. To enable communication with data stores 560A-E implemented for different protocols, the data transaction manager 520 may be coupled to one or more additional drivers 531A-E. Each driver 531A-E may be used to translate objects and requests into the specific formats used by the data stores 560A-E. Each additional driver 531A-E may include rules on how to translate an incoming protocol into a protocol used by the data stores 560A-E and how to translate responses going out from the protocol used by the data stores 560A-E into the protocol used by the transaction manager 520. In one implementation, the type of data store of the data stores 560A-E is indistinguishable from other data stores 560A-E to users or client applications. In one example, the data store 560A is formatted in NoSQL database format, data store 560B is formatted in a relational database format, and data store 560E is formatted in an additional format.

Figure 6:
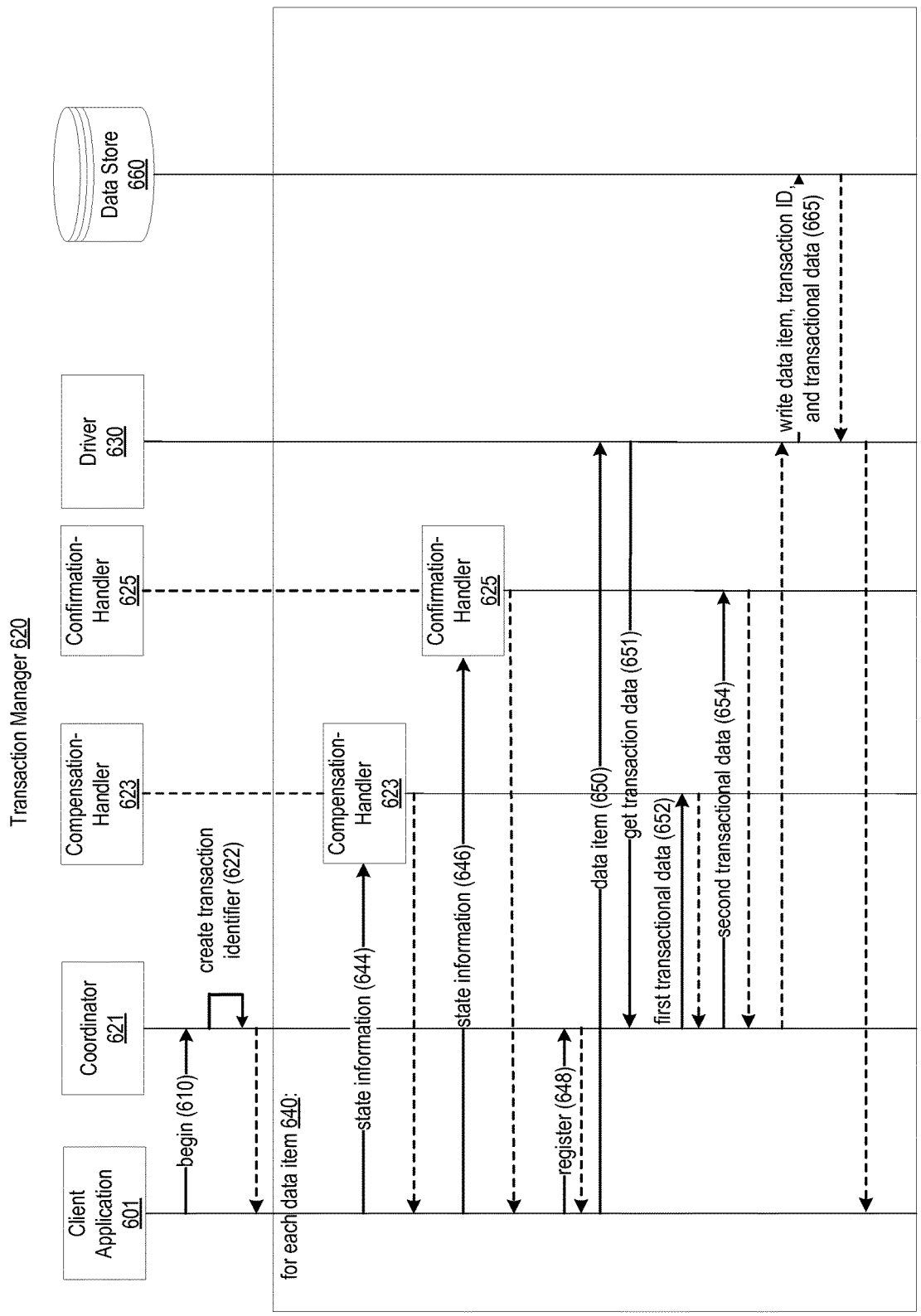
FIG. 6 illustrates a sequence diagram of an example of a transaction manager supporting changes to multiple data items in a single transaction, in accordance with an embodiment of the present invention.

FIG. 6 illustrates a sequence diagram of an example of a transaction manager supporting changes to multiple data items in a single transaction, in accordance with one example. In an implementation, a transaction manager 620 coordinates a distributed transaction to complete changes to multiple data items. At block 610, a client application 601 begins a transaction by calling a coordinator 621 of the transaction manager 620 with a begin transaction call 610. The coordinator 621 then creates a new transaction and creates a transaction identifier for that transaction 622. Once the transaction has been created, control may be returned to the client application 601. The remaining operations shown in FIG. 6 may be implemented for each data item.

The transaction manager 620 receives state information 644 from the client application and uses the state information to create a compensation handler 623. The transaction manager 620 may also receive state information 646 and use the state information to implement a confirmation handler 625. In one implementation, confirmation handler 625 may be part of the client application 601 that is initiated or loaded in the client application 601 by the transaction manager 620. At block 648, the client application 601 registers the compensation and confirmation handlers with the coordinator 621. At block 650, the client application 601 provides a data item to a driver 630 included in the transaction manager 620. The driver 630 may be a proxy driver that resembles a standard driver for a data store 660. At block 651, the driver 630 calls the coordinator 621 to request transactional information that is to be added to the data item. The coordinator 621 may receive a first transactional data 652 from the compensation handler 623 and a second transactional data 654 from the confirmation handler 625. Alternatively, coordinator 621 may serialize the compensation handler 623 to create the first transactional data 652 and may serialize the confirmation handler 625 to create the second transactional data 654. The coordinator 621 then provides transactional information including the first transactional data, the second transactional data and the transaction identifier to the driver 630.

The driver 630 adds the transaction ID, first transactional data, and second transactional data to the data item. At block 665, the driver 630 provides the changed data item including the transaction ID and transactional data to the data store 660. In one embodiment, driver 630 invokes an additional driver (not shown) that interfaces with the data store 660. The process 640 is repeated for each data item of the transaction to be changed. The first stage may end when all the data items modified by the transaction are written to the data store 660.

FIG. 7 illustrates a sequence diagram of an example of a transaction manager supporting a second stage for a one-phase commit transaction in accordance with an embodiment. The second stage may include implementing a second compensating transaction if the completed transaction is to be reversed or implementing confirmation of the completed transaction. The second stage may be triggered when a transaction manager 720 receives an instruction to cancel 771 or to confirm and close 741 the transaction. Cleanup of added transactional information from data items may be implemented during the second stage or asynchronously. For example, in a scenario where transaction manager 720 does not receive the instruction to trigger the second stage and the transaction does not complete successfully, a recovery process may implement compensation, confirmation, and/or cleanup operations as described in reference to FIG. 8.

Referring to FIG. 7, a client application 701 triggers the process of the second stage by sending the instruction to close a transaction 741 or cancel a transaction 771. Responsive to receiving the command 741 to successfully close the transaction 740, a coordinator 721 may save the close command in a transaction log at 742. A transaction log may be used to assist operations such as recovery. In the event the second stage fails or aborts prior to completing operation for each confirmation handler(s) 725, the saved instruction or message in the transaction log 742 may be used in the recovery process. A transaction log may also be used to track the closing of confirmation handlers. For example, the transaction log may track a count of the number of data items of the transaction.

Then, for each confirmation handler 745 associated with a distinct data item, operations are implemented to confirm the transaction and clean up the data item. At block 746, coordinator 721 invokes confirmation handler 725. Confirmation handler 725 then implements actions to create an updated data item 747 that does not include transactional information associated with the transaction, and provides the updated data item 747 to a driver 730.

The confirmation process may include generic or customized data received from the requestor (e.g., client application 701). In an example of a reservation booking, the confirmation operation may also calculate a fee, send a confirmation message, or notify other systems that one less spot of the type confirmed is available for booking.

A check can be implemented to determine whether processing or cleanup may be delayed or occur asynchronous to the confirmation process. That is, the removal of the added data at block 748 may be asynchronous to the operation at block 747. For example, the implementation may provide the data item back to the data store 760 at block 748 with the changes confirmed and the data item including added data. The added data may be removed through asynchronous, delayed, batch, and/or filter operations.

The driver 730 then invokes another driver that writes the updated data item to the data store 760. This effectively removes the transaction information 748 from the data item. In one implementation, the data store receives the modified version of the data item minus the transaction ID and transactional information. Once the updated data item has been written to the data store, coordinator 721 may remove an entry for the transaction from the transaction log 752, after which control may be returned to the client application 701. The process 745 is repeated for each confirmation handler of the transaction to be confirmed. The transaction may end when all the modified data items of the transaction are confirmed.

In response to receiving a command 771 to cancel a transaction, compensation 770 operations are implemented for each compensation handler 775 associated with a distinct data item to reverse the changes of the transaction and clean up the data item. At block 776, a compensation handler 723 is invoked to undo the changes made to the data item by the transaction. Compensation handler 723 may be logic of the client application 701 that is initiated or loaded in the client application 701 by the transaction manager 720. The data item changes are undone in view of compensation instructions in the compensation handler that are specific to the transaction and to the data item and mirror compensation instructions included in the first transactional data. Compensation handler 723 then implements actions to reverse changes made to the data item as a result of the transaction, create an updated data item 777 that does not include the changes and transactional information associated with the transaction, and provides the updated data item 777 to a driver 730.

The compensation process may include execution of instructions based on data received from the requestor (e.g., client application 701). In the example of a reservation booking, the compensation operation may refund a charge, send a cancellation message, or notify other systems that the spot of the type is available for booking. A check can be implemented to determine whether processing or cleanup may be delayed or occur asynchronous to the compensation process as discussed in reference to FIG. 3B. That is, the removal of the added data at block 778 may be asynchronous to or delayed from the operation at block 777. For example, an implementation may provide the data item back to the data store 760 with the changes undone and the data item including added data. The added data may be removed through asynchronous, delayed, batch, and/or filter operations.

The driver 730 may invoke another driver to write the updated data item to the data store 760. This effectively removes the transaction information 778 from the data item and reverses changes to the data item caused by the transaction. Once the updated data item has been written to the data store, coordinator 721 may remove an entry for the transaction from the transaction log (not shown), after which control may be returned to the client application 701. The process 775 is repeated for each compensation handler. The transaction may end when all the data items modified by the transaction are updated and written to the data store 760.

Figure 8:
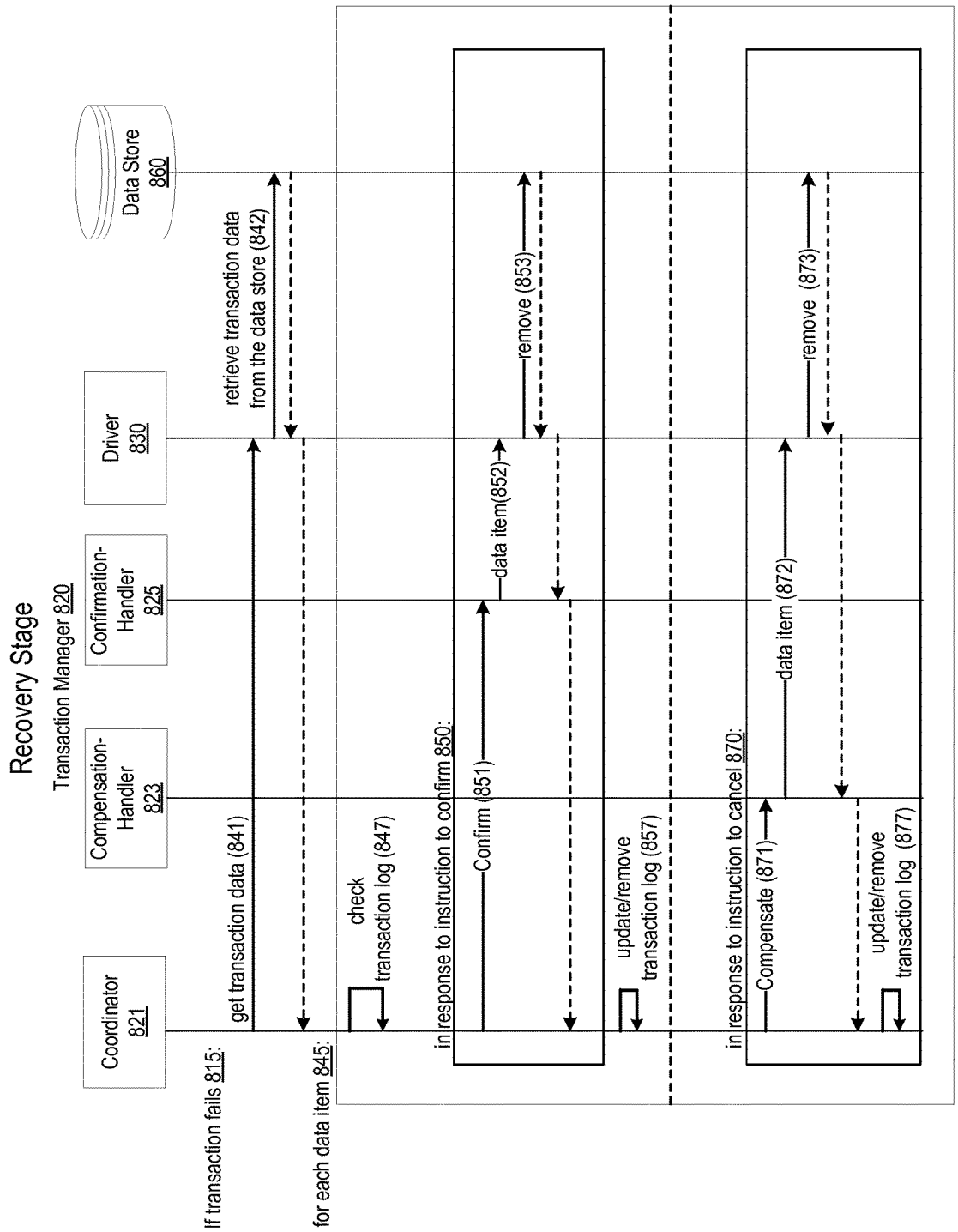
FIG. 8 illustrates a sequence diagram of an example of a transaction manager supporting a recovery process in accordance with an embodiment of the present invention.

FIG. 8 illustrates a sequence diagram of an example of a transaction manager supporting a recovery process for a one-phase commit transaction in accordance with an implementation of the present implementation. The recovery process includes implementing a second compensating transaction if the completed change is to be reversed or implementing confirmation operations to confirm the transaction. The recovery process may be triggered when a transaction manager 820 detects or receives an indication that a transaction failed, aborted, or canceled. For example, the transaction manager 820 may implement the recovery process responsive a system failure to start or resume compensation, confirmation, and/or cleanup operations.

Referring to FIG. 8, a detection of a system crash or an instruction triggers the recovery process at block 815. In response to the trigger 815, a coordinator 821 may get transaction data 841 from a data store 860 via a driver 830. The driver 830 may invoke another driver (not shown) that may retrieve all the transaction data 842 from the data store 860. In one implementation, the coordinator 821 may include processing logic to query the data store 860 to identify data items that contain a transaction ID. For example, the transaction manager 820 may check via the driver 830 to see whether there is a transaction in-flight (pending). If a transaction is in flight, the coordinator 821 with the driver 830 may obtain each data item of the in-flight transaction along with the transaction ID and any transactional data (e.g., serialized data) for each data item returned from the data store 860.

Various implementations to perform identification may be considered. For example, the transaction ID may be used to determine whether the recovery operation 815 may invoke a compensation operation 870 or a confirmation 850 operation on a recovered transaction. In one implementation, for each data item 845, the coordinator 821 may check a transaction log 847 to determine whether the transaction ID of the retrieved data item is contained in the transaction log of the recovered transaction. If an instruction received from a requestor is recorded in the transaction log, the coordinator 821 may proceed to 850 in response to an instruction to confirm or to 870 in response to an instruction to cancel.

The transaction manager 820 may use various techniques such as presumed-abort, presume-commit, or presume nothing. In an implementation, presumed-abort is used. With the presumed-abort protocol, whenever the data item is changed in the data store, as in the first stage of the compensation process, the status of the transaction is recorded in the transaction log. In this example, during the recovery stage, the existence of the transaction ID in the log indicates the data item was changed (i.e. committed) in the first stage and triggers compensation operation 870 during recovery. That is, any earlier crash is presumed to have aborted. For presumed-commit protocol, the coordinator 821 knows the transaction ID of which transactions canceled or aborted.

The transaction data retrieved at block 842 containing the transaction ID and transactional data may have undergone data transformation in the first stage as discussed with reference to FIGS. 3A. Such data transformation techniques may include serialization or marshaling of the transactional data. The transactional data includes confirmation data and/or compensation data. For recovery, the coordinator 821 retrieves the data item and may restore the transactional data from the transformed data format and/or process the data item(s) represented in a transformed format. In one example, a structured data detector may reverse the data transformation process to load the data. The process of converting a sequence of bytes into a data structure is generally referred to as de-serialization or rehydration. The data structures may be handlers (e.g., compensation handler data structures or confirmation handler data structures) of the client application initiated or loaded in the client application by a transaction manager 820. In one embodiment, restructured, de-serialized, or reconstructed transactional data may be used to create handlers to perform the confirmation operations of block 850 or the compensation operations of block 870.

In response to instructions or a determination to confirm 850 a change of the first stage associated with a distinct data item, operations are implemented to confirm the transaction and clean up the data item. Coordinator 821 may generate a confirmation handler from the transformed confirmation data retrieved from the data item. At block 851, coordinator 821 invokes confirmation handler 825 to perform the confirmation operation. The confirmation handler 825 then implements actions to update data item 852 so as to not include transactional information associated with the transaction and provides the updated data item 852 to a driver 830.

The confirmation process may include generic or customized data received from the requestor (e.g., client application) as well as include business logic, for example, to calculate a fee, send a confirmation message, or notify other systems that one less spot of the type confirmed is available for booking.

The driver 830 may invoke another driver to write the updated data item to the data store 860. This effectively removes the transaction information 853 from the data item. Once the updated data item has been written to the data store, coordinator 821 may update or remove an entry for the transaction from the transaction log 857.

In response to instructions or a determination to cancel 870 a change of the first stage associated with a distinct data item, operations are implemented to undo the change and clean up the data item. Coordinator 821 may generate a compensation handler from the transformed compensation data retrieved from the data item. At block 871, coordinator 821 invokes compensation handler 823 to perform the compensation operation to reverse the changes of the transaction The data item changes are undone in view of compensation data in the compensation handler that are specific to the transaction and to the data item. The recovery compensation changes mirror compensation instructions included in the transactional data. In one instance, undoing a change may include additional logic or operations to undo the changes and restore the data item in the data store. Compensation handler 823 updates data item 872 to not include the changes and via the driver 830 removes the transactional information associated with the transaction, and provides the updated data item to the data store 860.

The driver 830 may invoke another driver to write the updated data item to the data store 860. This effectively removes the transaction information and restore the data item 873 from the data item. Once the updated data item has been written to the data store, coordinator 821 may update or remove the transaction from the transaction log 877.

Figure 9:
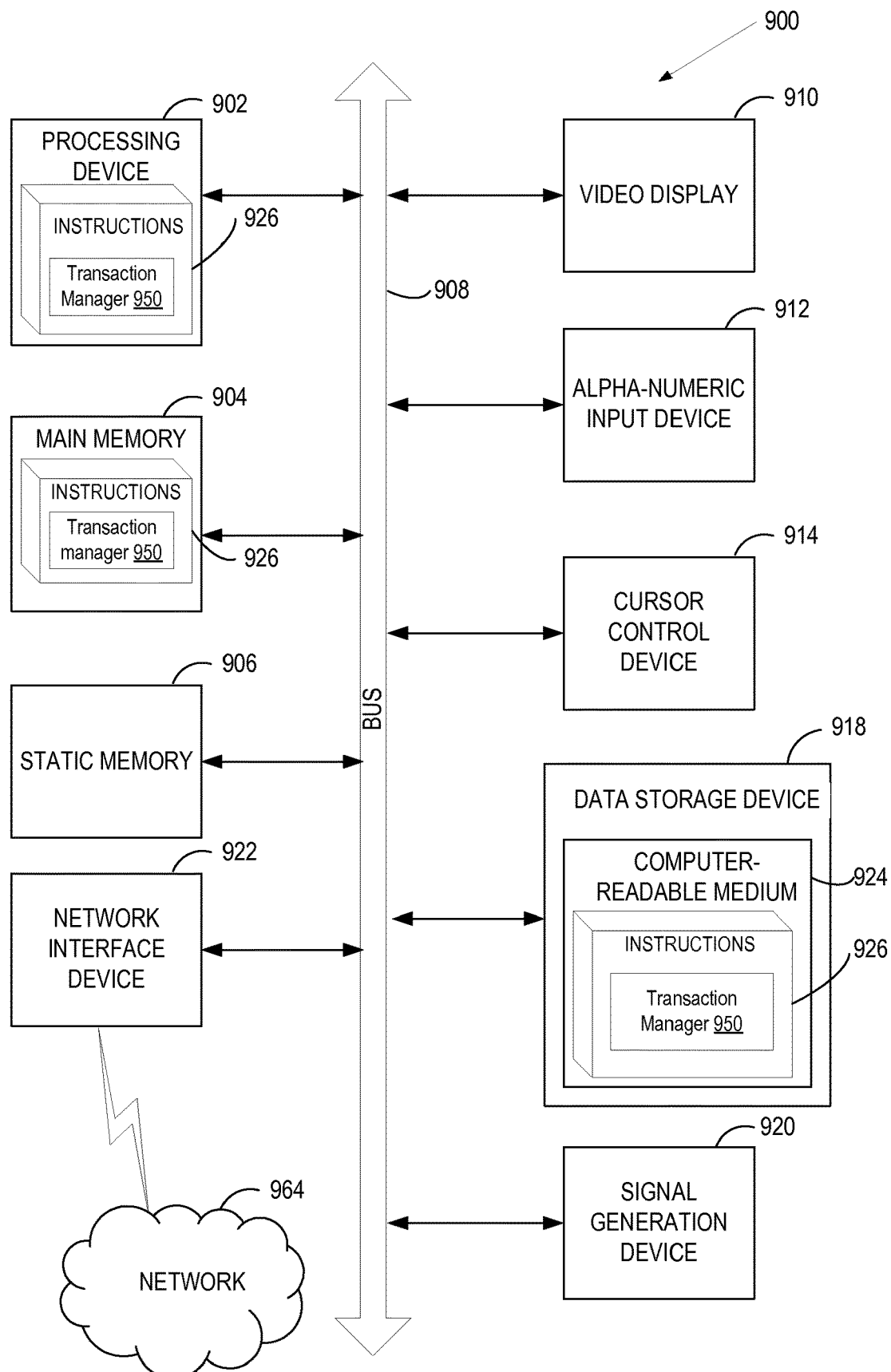
FIG. 9 illustrates a block diagram of an example computer system, in accordance with an embodiment of the present invention.

FIG. 9 illustrates a diagrammatic representation of a machine in the example form of a computing device 900 within which a set of instructions, for causing the machine to implement any one or more of the methodologies discussed herein, may be executed. In alternative embodiments, the machine may be connected (e.g., networked 964) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to implement any one or more of the methodologies discussed herein.

The example computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory (e.g., a data storage device 918), which communicate with each other via a bus 908.

Processing device 902 represents one or more general-purpose processors such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is implemented to execute the processing logic (instructions 926) for performing the operations and steps discussed herein.

The computing device 900 may further include a network interface device 922. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-readable storage medium (or more specifically a computer-readable storage medium) 924 on which is stored one or more sets of instructions 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting computer-readable storage media.

The computer-readable storage medium 924 may also be used to store a transaction manager 950 and/or resource manager (e.g., the transaction manager 120 of FIG. 1), and/or a software library containing methods that call transaction managers or resource managers. While the computer-readable storage medium 924 is shown in an example embodiment to be a single medium, the term "computer-readable storage medium" should be taken to include a single medium or multiple media (e.g., a centralized or distributed database, and/or associated caches and servers) that store the one or more sets of instructions.

The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the discussion, it is appreciated that throughout the description, discussions utilizing terms such as "determining", "notifying", "sending", "receiving", "committing", or the like, refer to the actions and processes of a computing device that manipulates and transforms data represented as physical (electronic) quantities within the computing device's registers and memories into other data similarly represented as physical quantities within the computing device's memories or registers or other such information storage, transmission or display devices.

Embodiments of the present invention also relate to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present invention may be provided as a computer program product, or software, that may include a computer-readable medium having stored thereon instructions, which may be used to program a computer system (or other electronic devices) to perform a process according to the present invention. A computer-readable medium includes any mechanism for storing information in a form readable by a machine (e.g., a computer). For example, a computer-readable medium includes a read only memory ("ROM"), random access memory ("RAM"), magnetic disk storage media, optical storage media, flash memory device, etc.

What is claimed is:

1. A method comprising:
    initiating, by a processing device executing a transaction manager, a transaction comprising a plurality of data items in one or more data stores of a distributed computing system, wherein the transaction is to cause a change to at least a first data item of the plurality of data items;
    generating, by the transaction manager, a first transactional data to be included in the first data item, the first transactional data comprising at least compensation data usable to undo the change to the first data item associated with the transaction, wherein the compensation data of the first transactional data comprises a serialized compensation data structure to undo the change to the first data item and complementary information regarding activities complementary to the undo operation; and
    inserting, by the transaction manager, the first transactional data into the first data item to be stored at the one or more data stores of the distributed computing system.

2. The method of claim 1, further comprising:
    undoing the transaction responsive to receipt of an instruction to undo the transaction.

3. The method of claim 2, further comprising:
    responsive to recovery from a system failure, performing the following comprising:
        retrieving the first data item from a first data store;
        extracting the first transactional data from the first data item; and
        undoing the change to the first data item in view of the first transactional data.

4. The method of claim 1, wherein the first transactional data is an object, and wherein the method further comprises adding the first transactional data to the first data item by serializing the first transactional data, wherein the serialized transactional data is added to the first data item.

5. A system comprising:
    data stores;
    a processing device to execute a transaction manager, operatively coupled to the data stores, the processing device to:
        execute a first stage, wherein in the first stage, the processing device is to:
            create, in view of a transaction, a data structure comprising a plurality of data items in one or more data stores of a distributed computing system, wherein the data structure is to cause a change to at least a first data item of the plurality of data items in a second stage and wherein the data structure comprises information to undo the change to the first data item, wherein the information comprises at least compensation data received from the transaction; and
            insert the compensation data into the first data item to be stored at the one or more data stores of the distributed computing system; and
        execute the second stage, wherein in the second stage, the processing device is to:
            undo the change to the first data item in view of the compensation data received from the transaction.

6. The system of claim 5, wherein the data structure is a handler of the transaction manager and written in the plurality of data items as part of an atomic update to the data stores.

7. The system of claim 6, wherein the transaction manager comprises a coordinator to coordinate multiple participants during a distributed transaction.

8. The system of claim 7, wherein the participants are at least one of another transaction manager, a local resource manager, a client, an application, or the data stores.

9. The system of claim 7, wherein the processing device is further to coordinate the distributed transaction, wherein to coordinate the distributed transaction, the processing device to:
    facilitate compatibility and cooperation between a plurality of the multiple participants; and
    determine participation in the distributed transaction; and
    determine which participants are able to commit or roll back a transaction.

10. The system of claim 5, wherein the transaction manager comprises one or more drivers to:
    receive or intercept the plurality of data items from an application; and
    modify the plurality of data items by adding or removing transactional information from the plurality of data items.

11. The system of claim 10, wherein the application to communicate with the data store via the one or more drivers using one of a memcached protocol, a REST protocol, a OData protocol, a Web sockets protocol, or a SQL protocol.

12. The system of claim 10, wherein the one or more drivers to translate objects and requests into specific formats used by the data stores, where at least one of the one or more drivers to include rules on (i) how to translate an incoming protocol into a protocol used by the data stores and (ii) how to translate responses going out from the protocol used by the data stores into a protocol used by a client application.

13. The system of claim 7, wherein coordinator to initiate a new transaction and generate a unique transaction identifier (ID) for the new transaction, wherein the new transaction has a transaction context to provide an associate between transactional operations on a respective one of the multiple participants and a client or service invoking the transactional operations, wherein the transaction context is associated with a transaction identifier.

14. The system of claim 7, wherein the coordinator to execute a compensation handler for each data item to be changed by a transaction, wherein the compensation handler is initialized in the first stage and invoked in the second stage of the transaction in response to either (1) a request to cancel the transaction or (2) during recovery of the transaction if the transaction failed.

15. The system of claim 14, wherein the compensation handler to use state data provided by a requestor to develop compensation data that are usable to undo changes to the at least first data item associate with the transaction.

16. A non-transitory machine readable storage medium comprising instructions that, when executed by a processing device, cause the processing device to:
   initiate, by the processing device, a transaction comprising a plurality of data items, wherein the transaction is to cause a change to at least a first data item of the plurality of data items, in one or more data stores;
   generate a first transactional data to be included in the first data item, the first transactional data comprising at least compensation data usable to undo the change to the first data item associated with the transaction via an undo operation, wherein the compensation data of the first transactional data comprises a serialized compensation data structure to undo the change to the first data item and complementary information regarding activities complementary to the undo operation;
   insert, by the processing device, the first transactional data into the first data item to be stored at the one or more data stores; and
   prioritize the undo operation in view of a type of the change or a category of the first data item.

17. The non-transitory machine readable storage medium of claim 16, wherein the undo operation is delayed to optimize the transaction.

18. The non-transitory machine readable storage medium of claim 17, wherein the undo operation comprises removing the first transactional data from the first data item and wherein the undo operation is delayed to either process as a batch operation prior to the transaction closing, wait until the system is idle, or performed in view of a monitored storage capacity.

19. The non-transitory machine readable storage medium of claim 17, wherein the undo operation is performed in view of a threshold of available memory.

20. The non-transitory machine readable storage medium of claim 16, wherein the transaction is to cause a change to a second data item of the plurality of data items, in one or more data stores, and wherein the processing device is further to generate a second transactional data usable to undo the change to the second data item associated with the transaction, wherein the second transaction data comprises a serialized compensation data structure to undo the change to the second data item and complementary information.

* * * * *